2,894,010
Patented July 7, 1959

2,894,010
ORGANIC ACID AND PROCESS THEREFOR

Herman A. Bruson, North Haven, and Jack Rockett, New Haven, Conn., assignors to Olin Mathieson Chemical Corporation, New Haven, Conn., a corporation of Virginia No Drawing. Application February 28, 1957
Serial No. 642,961

1 Claim. (Cl. 260—404)

This invention relates to omega-carbamylundecanoic acid, process for its synthesis, and derivatives thereof.

Aminoundecanoic acid is an omega amino acid of considerable interest because it can readily be condensed to form a linear polyamide well adapted for films, fibers and molded products of excellent quality. However, prior methods of making this amino acid have involved many steps and excessive cost.

An object of this invention is the provision of a novel compound readily convertible in one step to omega aminoundecanoic acid. Other objects include the provision of a novel compound and derivatives, and process therefor, which compound and derivatives are well adapted for a number of uses because of novel structural features.

The above objects have been accomplished by the synthesis and conversions, as described and indicated below, of omega-carbamylundecanoic acid, having the formula $H_2N-CO-(CH_2)_{10}-COOH$.

It has been found that this acid can be prepared readily in excellent yield by reacting the monomethyl ester of dodecanedioic acid with excess ammonia at atmospheric or somewhat higher pressure in the presence of a solvent for the starting half ester and of the amidic product. Water and dimethylformamide have been shown to be especially good solvents for this reaction. The ethyl, propyl, isopropyl, butyl, amyl and hexyl half esters may replace the methyl.

Example 1

A mixture of 43.8 grams (0.18 mole) of the methyl half ester of dodecanedioic acid $$CH_3-O-CO-(CH_2)_{10}-COOH$$

and 735 ml. of concentrated aqueous ammonium hydroxide (58% by weight $NH_4OH$) was stirred at room temperature for 22 hours. Two liters of water at room temperature were added to the solution with agitation and the resulting solution was filtered. The filtrate was cooled to 0° C. and acidified with 650 ml. of concentrated hydrochloric acid (37% by weight HCl). The resulting white precipitate was separated by filtration and dried, yielding 40.7 grams of product. On crystallization from dioxane, 33.6 grams (81.8% yield) of fine white needle-shaped crystals were obtained, having a melting point of 133°–134° C. Analysis of the new compound showed 6.05% nitrogen and acid number of 244.6, close to the theoretical values 6.12% N and acid number of 245.

During the reaction, the free carboxy group of the half ester was converted to the ammonium salt and the methoxy group was gradually replaced by the amino group. Then, neutralization with HCl resulted in the precipitation of the novel carbamylundecanoic acid.

Example 2

A mixture of 10 grams (0.041 mole) of methyl hydrogen dodecanedioate and 50 ml. of dimethylformamide was placed in a 500 ml. stainless steel bomb and the mixture was cooled to −50° C. in a Dry Ice bath. Then, 70 grams (4.1 moles) of liquid ammonia was added to the mixture. The bomb was closed and then agitated as the temperature was increased to 75° C., the pressure increasing to 500 pounds per square inch. After 17 hours at 75° C., the bomb and contents were cooled to room temperature. The pasty reaction mixture was transferred by washing with water to a vacuum distilling flask. Water was removed by distilling at 40° C. at a pressure of 27 mm. of mercury and dimethylformamide was then removed by distilling at 40° C. and a pressure of 9 mm. of mercury. The residue was dissolved in water and the solution was made alkaline with ammonium hydroxide. The solution was filtered, acidified with HCl and the resulting white precipitate was separated by filtration. After crystallization from methanol, 6.6 grams (70.3% yield) of fine white needle-shaped crystals were obtained, having a melting point of 130–131° C. Analyses showed 6.19% N and an acid number of 244.

The acid prepared in accordance with the above examples, preferably by the first example, is readily converted to 11-aminodecanoic acid, for example by the following procedure.

Example 3

A 500 ml. flask containing 5 grams (0.022 mole) of omega-carbamylundecanoic acid was cooled in an ice bath and 100.0 ml. of 0.46 normal sodium hypochlorite solution was added rapidly thereto. During good agitation, the solution was allowed to warm gradually to 28° C. in an hour, maintained at that temperature for an hour, and was then heated to 36° C. and kept there for an hour. The solution was then heated to 75° C. and then cooled to 25° C. where a solid precipitate appeared. Water was added to a total volume of 250 ml. and the solution was warmed until clear. Sufficient concentrated hydrochloric acid solution, 23 ml. was added to result in a pH of 1 and the solution was filtered. The filtrate was made alkaline with ammonium hydroxide and the resulting precipitate was filtered and dried. The product was 3.7 grams (84.2% yield) of 11-aminoundecanoic acid, having a melting point of 187°–188° C. and displaying on analysis close to the theoretical nitrogen content (6.9%) and close to the theoretical acid number (279).

The methyl half ester constituting the starting material for Examples 1 and 2 may readily be prepared from a diester of dodecanedioic acid. For example, to 95.6 grams of the dimethyl ester dissolved in 475 ml. of methanol, there was added dropwise 371 ml. of 0.5 normal methanolic barium hydroxide. The mixture was then heated on a steam bath under reflux for 24 hours. The mixture was then at pH 7 and was filtered, unreacted dimethyl ester being contained in the filtrate. The separated precipitate, the dry barium salt, was mixed with a solution of 50 grams of sodium sulfate in a liter of water, and heated, with stirring, on a steam bath for 3 hours. The mixture was filtered to remove barium sulfate and the filtrate was acidified with dilute HCl. The resulting precipitate was filtered and dried, 36.7 grams of product being obtained. This product was extracted with low boiling (30°–60° C.) petroleum ether, leaving an insoluble residue of 5 grams of dodecanedioic acid. The extract yielded 30.1 grams (64.3% yield) of white crystals, having a melting point of 52° C. and composition corresponding to the formula $$CH_3O-CO-(CH_2)_{10}-COOH$$

The methyl half ester may be replaced as starting material in Examples 1 and 2 by other half esters containing instead of the methyl group another lower alkyl radical containing up to six carbon atoms.

Carbamylundecanoic acid is applicable as an intermediate in the synthesis of other compounds in addition to 11-aminoundecanoic acid, for example esters, N-alkylated compounds, and their derivatives. Certain heavy metal salts such as of manganese, lead and cobalt, obtainable by neutralization of the free acid or by double decomposition with a water-soluble salt, such as the ammonium or alkali metal salt, generally have sufficient oil solubility to act as driers. The lithium, aluminum and alkaline earth sats thicken oils sufficiently to be advantageous as greases. Also, the carbamylundecanoic acid is an excellent starting material for effective wetting agents, wherein the carboxy is esterified with a long chain alcohol containing 8 or more carbon atoms, as with octyl, myristyl, lauryl or stearyl, and preferably the molecule has been rendered more hydrophilic by the addition of ethylene oxide units to the amino group.

In the formation of the carbamylundecanoic acid, the efficient conversion of the ester group to the amido group by means of ammonia appears to depend mainly on the solubilizing effect of the ammonium salt group present in the molecule.

We claim:

Process for preparing aminoundecanoic acid comprising mixing carbamylundecanoic acid and sodium hypochlorite solution at a temperature between 0° and about 28° C. and gradually warming the said mixture to substantially 75° C. in about four hours.

References Cited in the file of this patent

Richter: Textbook of Organic Chemistry, 1938 edition, page 204, John Wiley & Sons, Inc., New York, N.Y.

Beilstein, Vierte Auflage, vol. 2, 2nd Supplement, page 616.

Heyes: J. Chem. Soc., 1952, 4935–7.